Oct. 24, 1939.     D. F. WARNER     2,177,544
VALVE MECHANISM
Filed Dec. 10, 1937     2 Sheets-Sheet 2
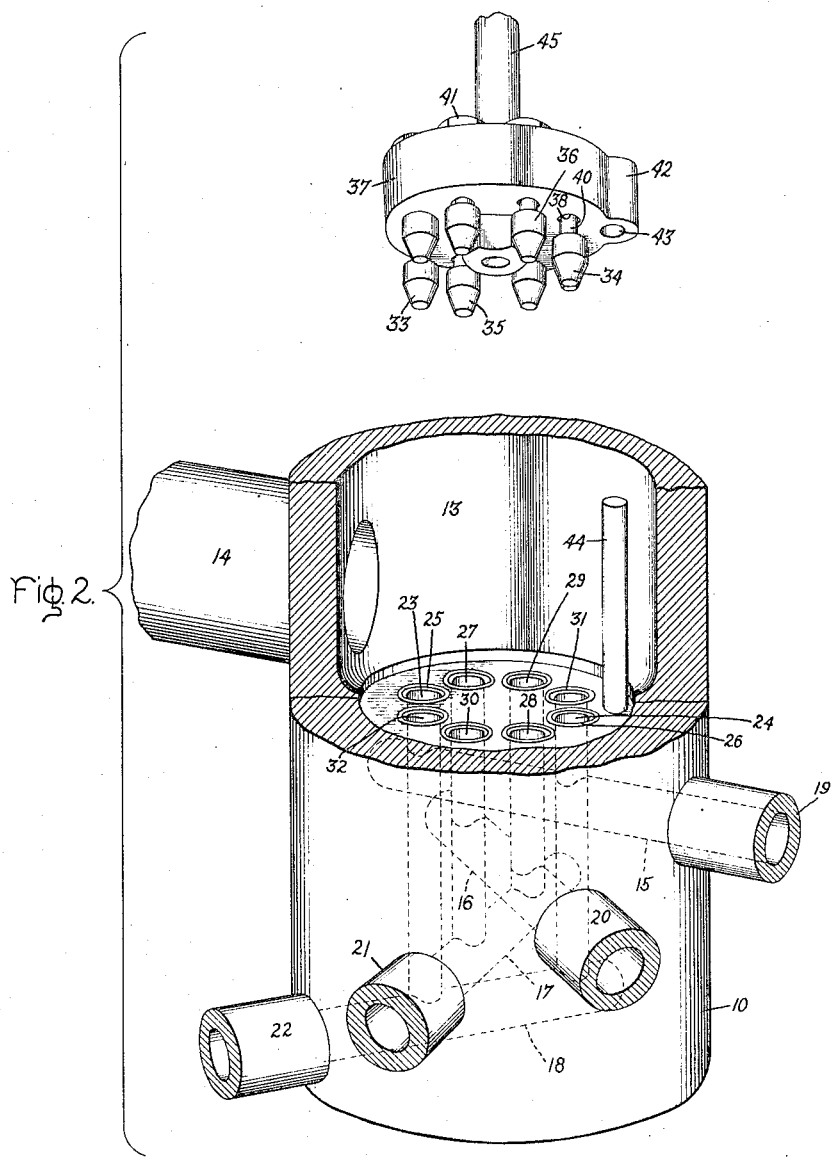
Inventor:
Donald F. Warner,
by Harry E. Dunham
His Attorney.

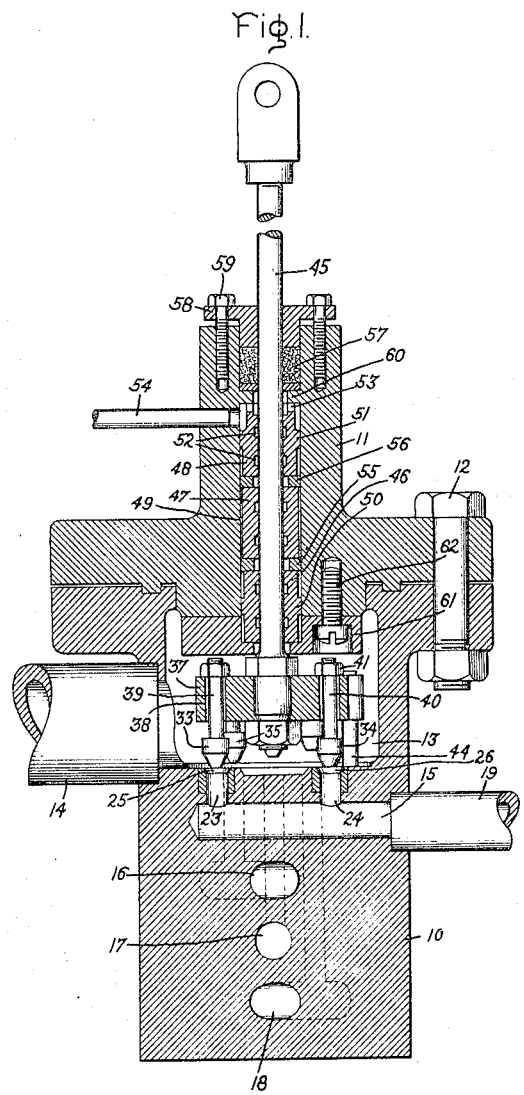

Patented Oct. 24, 1939

2,177,544

UNITED STATES PATENT OFFICE 2,177,544

VALVE MECHANISM

Donald F. Warner, Swampscott, Mass., assignor to General Electric Company, a corporation of New York Application December 10, 1937, Serial No. 179,169

4 Claims. (Cl. 137—158)

The present invention relates to valve mechanisms, that is, to devices for controlling the flow of fluid through a conduit. More specifically, the invention relates to the kind of valve mechanisms in which a plurality of individual valve elements are arranged to be successively opened and closed to increase and to reduce respectively the flow of elastic fluid to a turbine. These valves may be arranged in a straight row or they may be arranged along the outer portions of a circular disk. The latter arrangement has the advantage of necessitating but little space and is therefore resorted to whenever the available space is limited as in the case of small and medium sized ships' turbines. The circular supporting disk for the valves in these arrangements is moved or positioned by means of a lifting rod secured to the center of the disk. The lifting rod has to be made of considerable strength and well guided due to the considerable bending forces to which the rod is subjected as long as one valve only is opened at a time. The non-uniform distribution of forces acting on the disk and the rod in this type of arrangement has caused considerable difficulty.

The general object of my invention is to provide an improved valve mechanism in which these drawbacks are overcome. This is accomplished in accordance with my invention by the provision of an even number of individual valves along the circumference or outer portion of a circular valve disk, which valves are opened in pairs with each pair comprising two valves arranged on diametrically opposite portions of the disk. With this arrangement, opening movement of the valve disk will cause opening of a first pair of valves and thereafter a second pair of valves, etc., to the effect that no bending forces are exerted on the lifting rod.

For a better understanding of what I believe to be novel and my invention, attention is directed to the following description and the claims appended thereto in connection with the accompanying drawings.

In the drawings, Fig. 1 illustrates a sectional view of a valve mechanism embodying my invention, and Fig. 2 illustrates a perspective detail view of certain parts of the mechanism of Fig. 1.

The valve mechanism comprises a valve body having a lower cylindrically shaped flanged portion 10 and an upper cylindrically shaped flanged portion 11 secured together by bolt means 12. The body forms a cylindrically shaped valve chamber or chest 13 to which elastic fluid is conducted through a conduit 14 secured to the lower body portion 10 and from which fluid is discharged through a plurality of openings 15, 16, 17 and 18 into conduits 19, 20, 21 and 22 connected to said openings and leading to a consumer such as separate first-stage nozzles of an elastic fluid turbine, not shown. Each of the aforementioned openings or bores 15 to 18 inclusive is horizontally arranged and communicates with the valve chamber or chest 13 through two vertical bores or channels. Thus, the horizontal bore 15 communicates through two vertical bores 23 and 24. The upper ends of the bores 23 and 24 are located diametrically opposite with regard to the center of the valve chamber 13. Valve seats 25 and 26 are formed at the upper ends of the bores 23 and 24 in the bottom of the valve chamber 13. Similarly, the horizontal bore 16 communicates with the valve chamber through vertical bores 27 and 28, the bore 17 communicates with the chamber through vertical bores 29 and 30 while the bore 18 is connected to the valve chamber by vertical bores 31 and 32. The flow of elastic fluid from the valve chamber 13 through the vertical bores is controlled by a plurality of pairs of valves, thus the flow of fluid through the bores 23 and 24 is controlled by two valves 33 and 34 arranged in alinement with the bores and the valve seats formed at the upper ends thereof while the flow through the vertical bores 27 and 28 is controlled by two valves 35 and 36. In opening position the individual valves of each pair are equally spaced from their seats so as to engage and disengage simultaneously the seats and thus to connect and disconnect simultaneously the corresponding vertical bores and the valve chamber. All of the valves 33, 34, 35, etc. are supported on a disk 37 which has a plurality, in the present instance 8 bores 38 uniformly spaced along its circumference. The valves 33 and 34 (Fig. 1) have stems 39 and 40 loosely projecting through the bores 38 and held on the disk by means of nuts 41 secured to the upper ends of the stems 39, 40. The present arrangement has four pairs of valves with the valves of each pair symmetrically arranged on opposite sides of a common center which coincides with the center of the lifting rod. While the lengths of the individual stems of each pair of valves are alike, these lengths differ as to the different pairs so that during opening and closing of the valves the pairs of valves will successively engage their valve seats. The disk 37 has a lateral projection or ear 42 with a bore 43 engaging a guide pin 44 secured to the lower body portion 10 in order to prevent circular movement of the disk 37 and thus to maintain alinement of the individual valves with their seats. The disk 37 is secured to the lower end of a lifting rod or stem 45 which has an upper end arranged for connection to some governing or control mechanism, not shown. The lifting rod 45 is of considerable length, sealed and guided within the upper body portion 11. The sealing and guiding means in accordance with my invention comprises a plurality of sleeves in the present instance three sleeves 46, 47 and 48 surrounding the stem 45 and disposed within a bore 49 in the upper body portion 11. The sleeve 47 which is intermediate the sleeves 46 and 48 forms a slight clearance in the bore and slides with its entire outer surface along the bore 49 and thus forms a guide sleeve, which may float laterally to accommodate for slight movement of the stem with changes in temperature, thus minimizing the risk of cramping and jamming of the stem and the packing. The sleeves 46 and 48 have short portions 50 and 51 tightly engaging the inner surface of the bore 49 to form rocking sleeves, permitting slight rocking of the lifting rod 45 about the intermediate sleeve 47 and to prevent leakage along the bore 49. Each sleeve has one or more breakdown grooves 52 to form a number of separate packing surfaces and thus gradually to reduce the pressure from the lower or high pressure end of the sleeve 46 to the upper or atmospheric end of the sleeve 48. Any fluid passing from the valve chamber along the stem towards said upper end is discharged through lateral openings 53 in the upper end of the sleeve 48 and a drain or bleed-off pipe 54 secured to the upper body portion 11. The three sleeves or packing cylinders are separated by rings or spacers 55 and 56. These rings are preferably made from corrosion-resisting material, such as chrome iron, and the sleeves and the stem are preferably nitrided. The portion of the stem above the bleed-off pipe 54 is sealed to the body by means of a soft packing 57, preferably made of graphite and asbestos to prevent leakage of fluid past the upper end of the stem. The soft packing 57 is held in place by means of an end plate 58 secured to the body by bolts 59. The upper sleeve 48 abuts with its end face against a projection 60 formed in the bore 49 of the upper body portion and the lower sleeve 46 is prevented from downward sliding movement by an end ring 61 secured to the upper body portion 11 by bolts 62. The stack of sleeves and spacers is assembled with a small axial clearance sufficient to allow freedom for the intermediate sleeve to float with misalinement of the stem.

With my invention I have provided an improved construction and arrangement of valve mechanisms which comprise a plurality of pairs of valves and valve seats spaced about a common center with the valves of each pair arranged diametrically opposite and symmetrically to such center. The valves have stems which are of equal length with regard to each pair but of different length with regard to different pairs so that during opening and closing movement the pairs of valves engage and disengage successively their seats. All of the valves are loosely supported on a disk secured to a lifting rod. Bending forces on the lifting rod during the opening movement of the valves are completely eliminated, wherefore the lifting rod may be made of smaller dimensions than has heretofore been necessary. As to the sealing arrangement of the lifting rod, the provision of a rocking sleeve on each side of a floating sleeve permits slight rocking movement of the lifting rod.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A valve mechanism including the combination of a body having lower and upper portions secured together and forming a chamber, a supply conduit connected to the chamber, means including a plurality of bores forming valve seats in the bottom of the chamber for discharging fluid therefrom, a supporting disk disposed within the chamber, a lifting rod secured to the disk and projecting through the upper body portion, a plurality of pairs of valves supported on and spaced along the circumference of the disk, each pair comprising two valves slidably held on diametrically opposite portions of the disk, the stems being of equal length with regard to each pair but of different length with regard to different pairs of valves.

2. A valve mechanism including the combination of a body forming a chamber with supply and discharge openings for the chamber, the discharge openings forming a plurality of pairs of valve seats in the bottom of the chamber with each pair comprising two seats arranged diametrically opposite from a common center with regard to all pairs of seats, a supporting disk disposed within the chamber, a lifting rod secured to the disk and projecting through the body and a plurality of pairs of valves in cooperative relation with the pairs of seats and supported on the disk, the valves having stems which are of equal length with regard to each pair but of different length with regard to different pairs to effect successive engagement and disengagement between the seats and the pairs of valves.

3. A valve mechanism including the combination of a body forming a chamber with supply and discharge openings for fluid, the discharge openings forming a plurality of pairs of valve seats with the seats of each pair formed diametrically opposite from a common center, a supporting disk, a valve for each seat having a stem projecting loosely through openings in the supporting disk and being held thereon, means for maintaining alinement between the valves and the seats, and means for moving the disk, the stems of the valves being of equal length with regard to each pair but of different length with regard to different pairs.

4. A valve mechanism including the combination of a valve chamber forming a plurality of pairs of seats with the seats of each pair arranged diametrically opposite from a common center for all the pairs, a movable support in the chamber, and a plurality of pairs of valves having stems held on the support in cooperative relation with the seats, the stems of the valves being of equal length with regard to each pair but of different length with regard to different pairs of valves.

DONALD F. WARNER.